(12) United States Patent
Noda et al.

(10) Patent No.: US 11,795,997 B2
(45) Date of Patent: Oct. 24, 2023

(54) FLUID FILM BEARING

(71) Applicant: MITSUBISHI HEAVY INDUSTRIES, LTD., Tokyo (JP)

(72) Inventors: Yoshitomo Noda, Tokyo (JP); Takuzo Shigihara, Tokyo (JP); Shimpei Yokoyama, Tokyo (JP); Chihiro Yoshimine, Tokyo (JP); Masaya Kawano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/695,233

(22) Filed: Mar. 15, 2022

(65) Prior Publication Data
US 2022/0316523 A1    Oct. 6, 2022

(30) Foreign Application Priority Data

Mar. 31, 2021 (JP) ................. 2021-061808

(51) Int. Cl.
*F16C 17/06* (2006.01)
*F16C 17/14* (2006.01)
*F16C 33/10* (2006.01)
*F16C 27/02* (2006.01)

(52) U.S. Cl.
CPC ............ *F16C 17/065* (2013.01); *F16C 17/14* (2013.01); *F16C 27/02* (2013.01); *F16C 33/1025* (2013.01)

(58) Field of Classification Search
CPC ........ F16C 17/03; F16C 17/035; F16C 17/06; F16C 17/065; F16C 17/14; F16C 27/02; F16C 33/1025; F16C 33/122; F16C 37/002
See application file for complete search history.

(56) References Cited

U.S. PATENT DOCUMENTS

| | | | | |
|---|---|---|---|---|
| 4,268,094 | A * | 5/1981 | Greene | F16C 27/063 384/107 |
| 4,286,828 | A * | 9/1981 | Sides | F16C 17/06 384/215 |
| 10,473,154 | B2 * | 11/2019 | Gonzalez | F16C 17/03 |
| 10,612,586 | B2 * | 4/2020 | Frydendal | F16C 17/06 |
| 11,274,698 | B2 * | 3/2022 | Frydendal | F16C 32/0677 |

FOREIGN PATENT DOCUMENTS

JP      2017-172732      9/2017

* cited by examiner

*Primary Examiner* — James Pilkington
(74) *Attorney, Agent, or Firm* — Wenderoth, Lind & Ponack, L.L.P.

(57) ABSTRACT

A fluid film bearing includes a plurality of bearing pads that are arranged in a circumferential direction of a rotating body that rotates about an axis, and that support the rotating body via a fluid film, wherein the bearing pad includes a base layer made of metal, an elastic layer that is layered on the rotating body side of the base layer, and that is made of an elastically deformable elastic material, a sliding layer that is layered on the rotating body side of the elastic layer, and that opposes the rotating body and is made of a bearing material, and a metal plate that is layered between the elastic layer and the sliding layer, and that is more rigid than the elastic layer and the sliding layer.

4 Claims, 6 Drawing Sheets

FLUID FILM BEARING

CROSS-REFERENCE TO RELATED APPLICATIONS

This application claims the benefit of priority to Japanese Patent Application Number 2021-061808 filed on Mar. 31, 2021. The entire contents of the above-identified application are hereby incorporated by reference.

TECHNICAL FIELD

The present disclosure relates to a fluid film bearing.

RELATED ART

For example, JP 2017-172732 A discloses, as a bearing used in a state of being submerged in water, a thrust bearing used as a lubricant by drawing surrounding water by rotation of a rotating body. This thrust bearing includes a plurality of bearing pads that are arranged in the circumferential direction of the rotating body, and oppose the rotating body from the axial direction of the rotating body.

The thrust pad has a three-layer structure including a base layer made of metal, an elastic layer layered on the base layer and made of an elastic material such as rubber, and a sliding layer layered on the elastic layer and made of a bearing material such as resin.

When the rotating body rotates, the thrust pad supports the rotating body in a non-contact manner by forming a water film as a lubrication film between the rotating body and the sliding layer.

SUMMARY

In the bearing pad described in JP 2017-172732 A, the surface pressure received from the rotating body is particularly large at the center part in the rotational direction. When such surface pressure is excessive, a relatively soft elastic layer made of rubber is greatly recessed, and accordingly, a large recess is generated as a whole of the bearing pad.

As a result, there has been a problem that it is difficult to appropriately form a water film between the bearing pad and the rotating body, and the load capacity decreases.

The present disclosure has been made to solve the above problem, and an object of the present disclosure is to provide a fluid film bearing capable of appropriately supporting a rotating body.

In order to solve the above-described problem, a fluid film bearing according to the present disclosure includes a plurality of bearing pads arranged in a circumferential direction of a rotating body that rotates about an axis, the bearing pads being configured to support the rotating body via a fluid film, in which each of the plurality of bearing pads includes a base layer made of metal, an elastic layer made of an elastically deformable elastic material, the elastic layer being layered on the rotating body side of the base layer, a sliding layer made of a bearing material, the sliding layer being layered on the rotating body side of the elastic layer and facing the rotating body, and a metal plate that is more rigid than the elastic layer and the sliding layer, the metal plate being layered between the elastic layer and the sliding layer.

According to the present disclosure, it is possible to provide a fluid film bearing capable of appropriately supporting a rotating body.

BRIEF DESCRIPTION OF DRAWINGS

The disclosure will be described with reference to the accompanying drawings, wherein like numbers reference like elements.

FIG. 4 is a side view illustrating a modified aspect of the bearing pad of the thrust bearing according to the embodiment of the present disclosure, where

FIG. 5 is a view illustrating a modified aspect of a bearing pad of a thrust bearing according to a comparative example, where

DESCRIPTION OF EMBODIMENTS

First Embodiment

Figure 1:
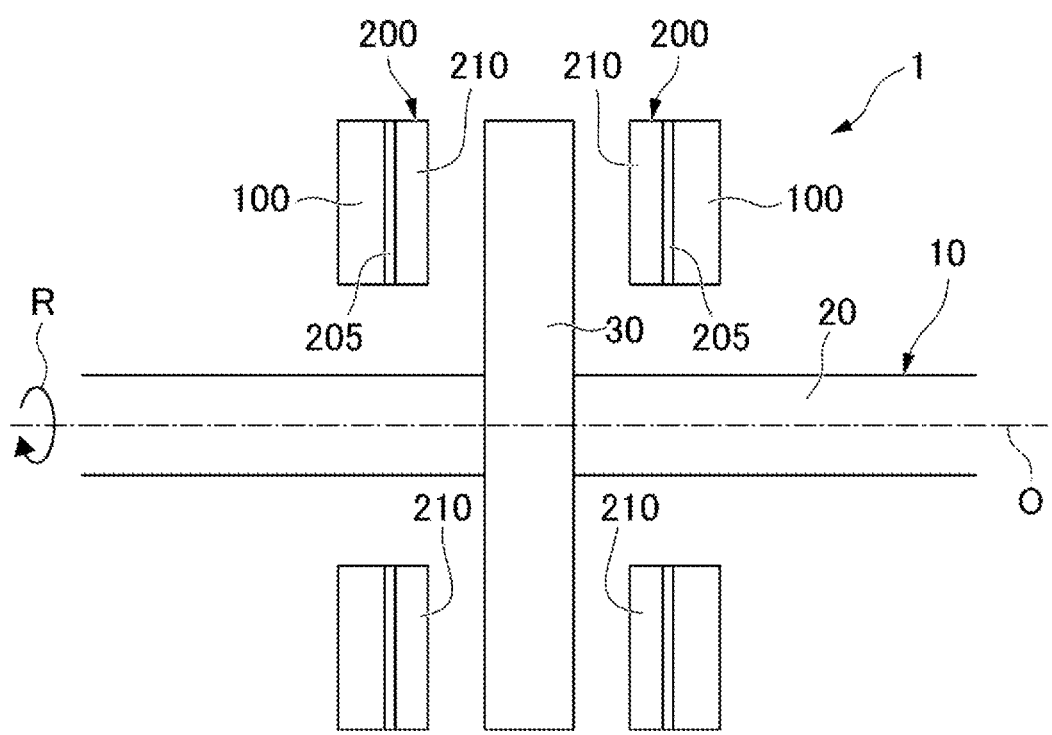
FIG. 1 is a schematic configuration diagram of a rotary machine according to an embodiment of the present disclosure.

A rotary machine according to a first embodiment of the present disclosure will be described below in detail with reference to FIGS. 1 to 4. A rotary machine 1 illustrated in FIG. 1 is used in a state of being submerged in water, and is a variety of equipment such as, for example, propulsion device for a water vessel and an underwater vehicle, an underwater pump, an underwater generator, and an underwater motor. The rotary machine 1 includes a rotating body 10, a stationary body 100, and a thrust bearing 200 as a fluid film bearing.

Rotating Body

The rotating body 10 includes a rotor shaft 20, and a thrust collar 30.

The rotor shaft 20 extends along a linearly extending axis O. The rotor shaft 20 is supported from radial outside by a radial bearing not illustrated. This enables the rotor shaft 20 to rotate about the axis O. The rotor shaft 20 is integrally provided with a functionally necessary configuration as the rotary machine 1 such as a propeller, a blade, and a screw.

The thrust collar 30 has a disc shape that protrudes radially outward from the whole region in the circumferential direction of the outside surface of the rotor shaft 20. The thrust collar 30 is integrally provided in the rotor shaft 20. As rotation of the rotor shaft 20 about the axis O, the thrust collar 30 also rotates about the axis O.

The stationary body 100 is provided so as to surround the rotating body 10 from radial outside on the outer circumferential side of the rotating body 10. The stationary body 100 is a part of various structures such as a casing, housing, hull, fuselage, and the like that enclose the rotating body 10, for example. The rotating body 10 rotates relative to the stationary body 100 about the axis O. In the present embodiment, a pair of the stationary bodies 100 are provided so as to hold the thrust collar 30 from both sides in the axis O direction.

Thrust Bearing

Figure 2:
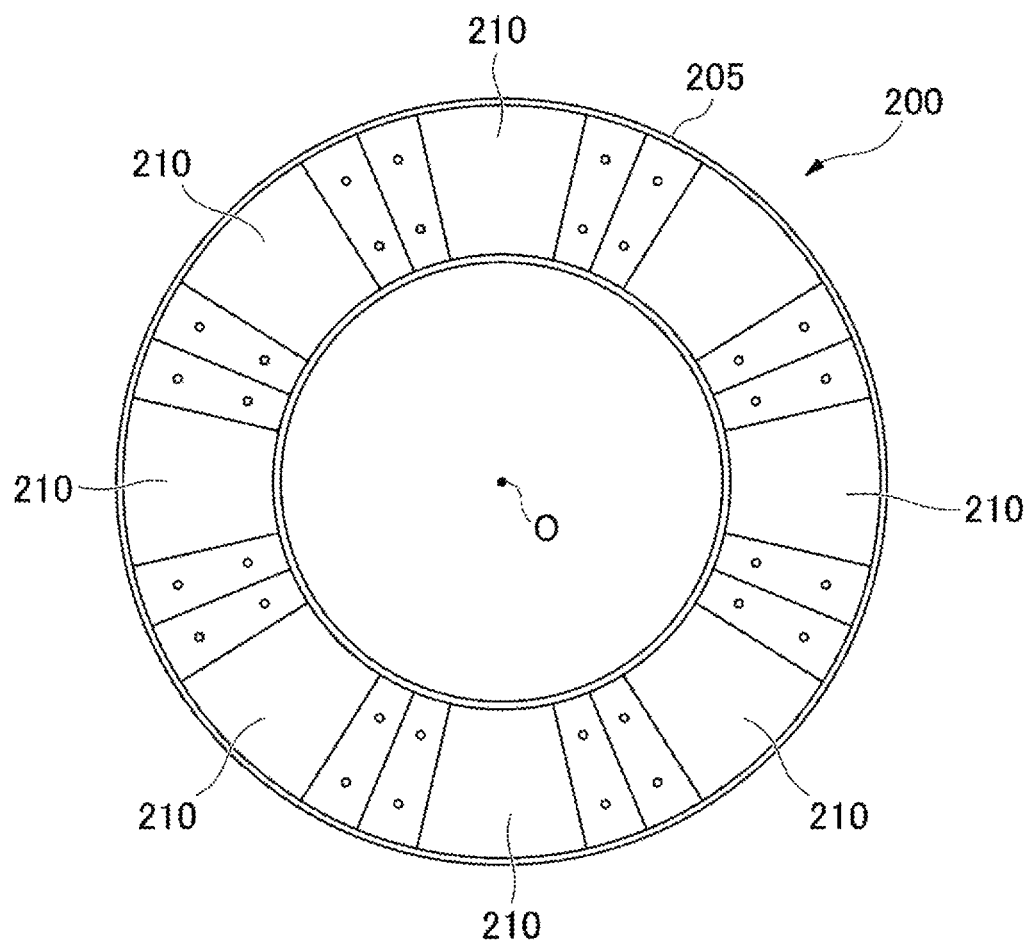
FIG. 2 is a view of a thrust bearing according to the embodiment of the present disclosure as viewed from an axial direction.

The thrust bearing 200 is disposed between the thrust collar 30 and the stationary body 100. The thrust bearing 200 is fixed to the stationary body 100. A pair of the thrust bearings 200 of the present embodiment are provided so as to hold the thrust collar 30 from both sides in the axis O direction. As illustrated in FIGS. 1 and 2, the thrust bearing 200 includes a disk 205 and a thrust pad 210 as a bearing pad.

Disk

The disk 205 is a member in an annular shape centered on the axis O and in a plate-like shape having a constant thickness in the axis O direction. The radial dimension of the disk 205 is constant throughout the circumferential direction. The disk 205 is provided coaxially with the rotor shaft 20 so as to surround the rotor shaft 20. The surface of the disk 205 opposite to the thrust collar 30 is fixed with respective to the stationary body 100 throughout the whole region in the circumferential direction.

The surface of the disk 205 facing the thrust collar 30 is a plane orthogonal to the axis O.

Thrust Pad

The thrust pad 210 is provided on a front surface that is a surface of the disk 205 on the thrust collar 30 side. As illustrated in FIG. 2, a plurality of the thrust pads 210 are provided in the circumferential direction on the front surface of the disk 205. The thrust pad 210 is provided so as to be circumferentially disposed on the front surface of the disk 205, and in an annular shape surrounding the axis O throughout the plurality of thrust pads 210.

Figure 3:
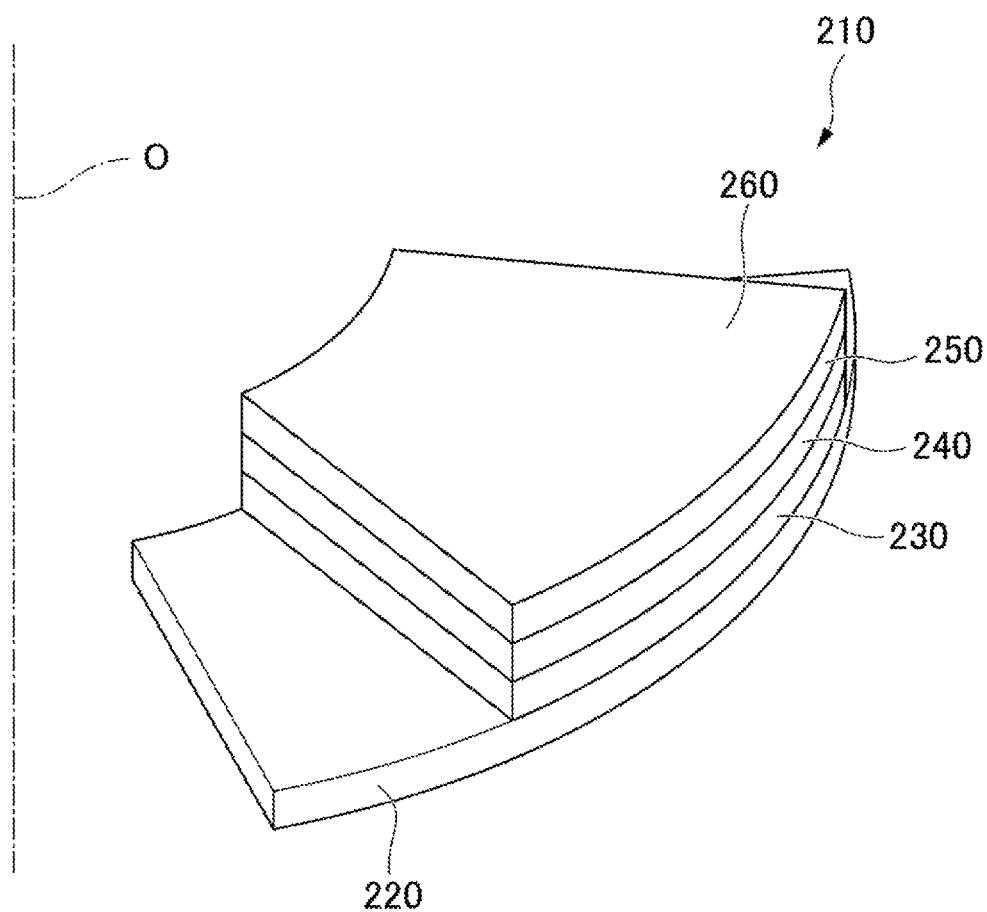
FIG. 3 is a perspective view of a bearing pad of the thrust bearing according to the embodiment of the present disclosure.

As illustrated in FIG. 3, each thrust pad 210 has a four-layer structure in which a base layer 220, an elastic layer 230, a metal plate 240, and a sliding layer 250 are sequentially layered from the disk 205 side (stationary body 100 side: lower side in FIG. 3) toward the thrust collar 30 side (rotating body 10 side: upper side in FIG. 3). The base layer 220, the elastic layer 230, the metal plate 240, and the sliding layer 250 each have a plate-like shape in which the opposite direction (axis O direction) of the rotating body 10 and the thrust pad 210, i.e., the layering direction of each layer of the thrust pad 210 as the thickness direction. Hereinafter, the surface on the stationary body 100 side of each of these layers is referred to as a back surface and the surface on the rotating body 10 side is referred to as a front surface.

Base Layer

The base layer 220 is made of metal. The base layer 220 is made of stainless steel, for example. The base layer 220 is a strength member that ensures the strength of the thrust pad 210.

The base layer 220 is arranged such that the back surface abuts the disk 205. The base layer 220 has an arc shape in which the circular ring is divided into a plurality (eight in the present embodiment) in the circumferential direction as viewed from the layering direction (axis O direction) of each layer. In the thrust pads 210 adjacent to each other, the circumferential end portions of the base layers 220 are in contact with each other. The base layer 220 is integrally fixed to the disk 205 via a bolt or the like, for example.

The front surface and the back surface of the base layer 220 are planes that are orthogonal to the axis O.

Elastic Layer

The elastic layer 230 is layered on the front surface of the base layer 220. The elastic layer 230 is made of an elastically deformable material, i.e., a material with a high elastic limit. The elastic layer 230 is made of various synthetic rubbers such as polybutadiene, nitrile, and chloroprene, for example.

The front surface and the back surface of the elastic layer 230 are planes orthogonal to the axis O in a state where no external force is applied to the thrust pad 210.

Metal Plate

The metal plate 240 is layered on the front surface of the elastic layer 230. The metal plate 240 is provided so as to cover the entire front surface of the elastic layer 230. The metal plate 240 is made of metal, similar to the base layer 220. The metal plate 240 is made of a steel material such as stainless steel or a metal high in corrosion resistance and rigidity such as titanium.

The front surface and the back surface of the metal plate 240 are planes that are orthogonal to the axis O.

Sliding Layer

The sliding layer 250 is layered on the front surface of the metal plate 240. The sliding layer 250 is provided so as to cover the entire front surface of the metal plate 240. The front surface of the sliding layer 250 is a pad surface 260 that opposes the thrust collar 30 across water. That is, the surface opposing the rotating body 10 in the thrust pad 210 is the pad surface 260.

The sliding layer 250 is made of a bearing material having a lower friction coefficient than that of another layer constituting the thrust pad 210. The bearing material may be either of a resin bearing material or a metal bearing material.

For example, polyether ether ketone (PEEK) and polytetrafluoroethylene (PTFE) that have high lubricating properties can be used as the resin bearing material. In addition, various resins such as polyacetal, nylon, polyethylene, phenolic resin, polyimide, polyphenylene sulfide, and polyamide imide may be used as the resin bearing material.

As the metal bearing material, a variety of bearing alloys lower in rigidity but smaller in friction coefficient than those of the metal plate 240 can be used. For example, various bearing alloys such as white metal, which is an alloy of a tin-lead-based alloy, as well as an aluminum alloy, and copper alloy can be used as the metal bearing material.

Overall Shape of Thrust Pad

The elastic layer 230, the metal plate 240, and the sliding layer 250 have the same shape as viewed from the layering direction of them. The elastic layer 230, the metal plate 240, and the sliding layer 250 have an arc shape in which the circular ring is divided into a plurality of sections as viewed from the layering direction. The circumferential dimensions of the elastic layer 230, the metal plate 240, and the sliding layer 250 are smaller than the circumferential dimension of the base layer 220. Therefore, the parts of the elastic layer 230, the metal plate 240, and the sliding layer 250 on both circumferential sides on the front surface of the base layer 220 are exposed without being covered by the elastic layer 230, the metal plate 240, and the sliding layer 250, respectively.

Shape of Pad Surface

Figure 4A:
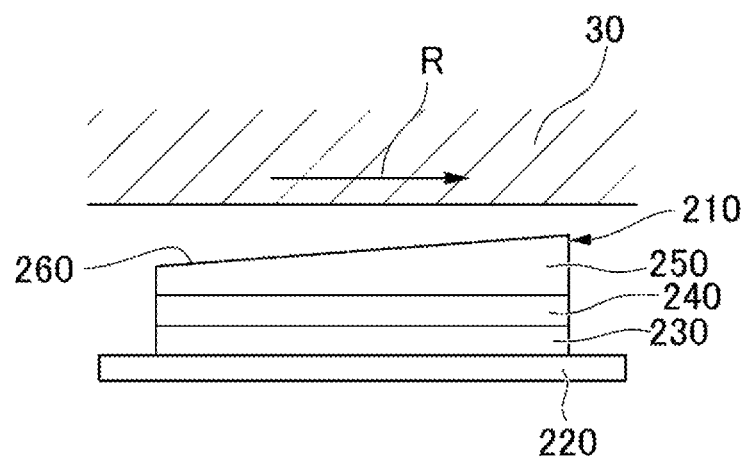
FIG. 4A is a view illustrating the aspect before modification.

Here, as illustrated in FIG. 4A, the front surface of the sliding layer 250, i.e., the pad surface 260, extends, throughout the entire region, so as to approach the thrust collar 30 toward the front side in a rotational direction R of the thrust collar 30. That is, the height of the pad surface 260 from the disk 205 increases toward the front side in the rotational direction R in the circumferential direction. In other words, the pad surface 260 has an upward slope toward the front side in the rotational direction R.

Due to this, the edge portion on the rear side in the rotational direction R of the pad surface 260 is farthest from the thrust collar 30 in the axis O direction. The edge portion on the front side in the rotational direction R of the pad surface 260 is closest to the thrust collar 30 in the axis O direction.

Furthermore, the back surface of the sliding layer 250 is a plane orthogonal to the axis O. Therefore, the thickness in the layering direction of the sliding layer 250 gradually increases toward the front side in the rotational direction R. A wedge-shaped clearance that gradually decreases toward the front side in the rotational direction R is provided between the pad surface 260 and the thrust collar 30.

Operational Effects

When the rotating body 10 rotates, water is brought by the thrust collar 30, thereby drawing water into the clearance between the thrust collar 30 and the pad surface 260. In particular, in the present embodiment, as illustrated in FIG. 4A, the pad surface 260 is provided with the upward slope toward the front side in the rotational direction R, and a water inlet side of the clearance is open. Therefore, the water brought by the thrust collar 30 can be easily drawn into the clearance.

Figure 4B:
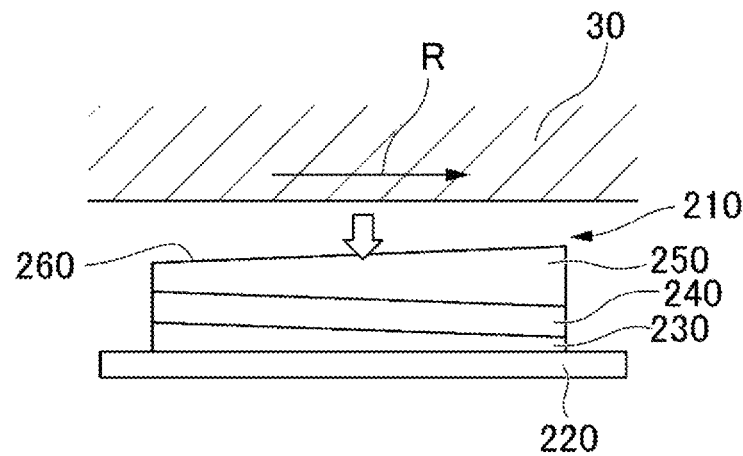
FIG. 4B is a view illustrating the aspect after modification.

The water thus drawn into the clearance forms a water film as a lubrication film in the clearance. When a load is transferred to the thrust pad 210 via this water film, the load acts as a surface pressure throughout the pad surface 260. Due to this, as illustrated in FIG. 4B, the elastic layer 230 of the thrust pad 210 greatly deforms, particularly in a part on the front side in the rotational direction R where the clearance is small. As a result, the slope of the pad surface 260 becomes a micro slope that is less than the initial slope.

When such a micro slope is formed, an appropriate wedge-shaped water film is formed in the clearance. Due to this, a local load is not applied to only a part of the pad surface 260, and surface pressure is applied to the entire pad surface 260. This can improve the load capacity of the thrust pad 210.

Here, the surface pressure transferred from the thrust collar 30 through the water film to the thrust pad 210 becomes particularly large at a central portion of the pad surface 260 in the rotational direction R.

Figure 5A:
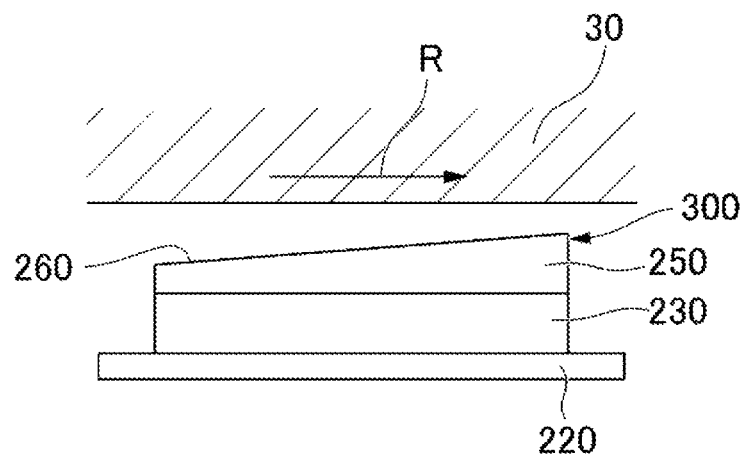
FIG. 5A is a view illustrating the aspect before modification.
Figure 5B:
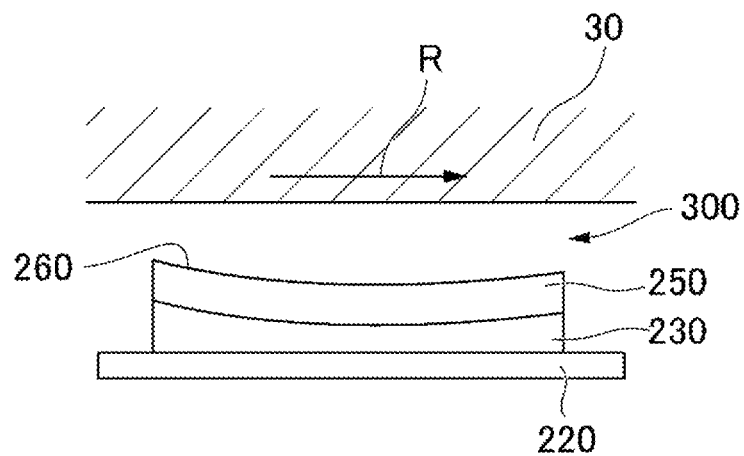
FIG. 5B is a view illustrating the aspect after modification.

For example, as illustrated in FIG. 5A, in the case of the three-layer thrust pad 300 including only the base layer 220, the elastic layer 230, and the sliding layer 250 without the metal plate 240, the elastic layer 230 deforms so as to be greatly crushed by the surface pressure. As a result, as illustrated in FIG. 5B, the entire thrust pad 210 is recessed so that, in particular, the part on the front side in the rotational direction R is deflected. Therefore, the appropriate wedge shape of the clearance cannot be maintained, and a local load is applied to the pad surface 260. In this case, since the boundary lubrication is performed at the end portion on the rear side in the rotational direction R, the load capacity of the thrust pad 210 as a whole is reduced.

In contrast, according to the present embodiment, the metal plate 240 having high rigidity is disposed between the sliding layer 250 and the elastic layer 230 even when surface pressure acts on the pad surface 260 via the water film, it is possible to suppress the elastic layer 230 from deforming so as to be recessed.

That is, even when a large surface pressure is applied to a central portion of the sliding layer 250, the surface pressure is dispersed and applied to the elastic layer 230 by the metal plate 240 having high rigidity on the back surface side. This makes it possible to avoid the elastic layer 230 from being largely recessed. This makes it possible to keep the wedge shape of the clearance, and to maintain the load capacity high.

OTHER EMBODIMENTS

While an embodiment of the present disclosure has been described above, the present disclosure is not limited thereto, and can be appropriately modified without departing from the technical idea of the disclosure.

Figure 6:
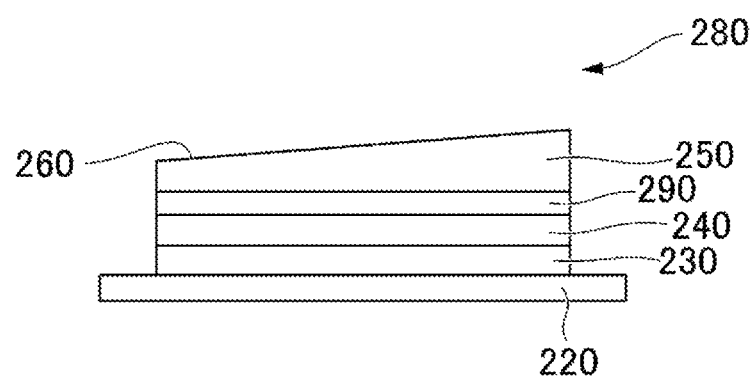
FIG. 6 is a side view of a bearing pad of a thrust bearing according to a modification example of the embodiment of the present disclosure.

For example, as a bearing pad 280 of a thrust bearing according to a modification example of the embodiment of the present disclosure, as illustrated in FIG. 6, for example, a configuration may be adopted in which a cooling plate 290 made of a metal material having a higher thermal conductivity than that of the metal plate 240 is provided between the sliding layer 250 and the metal plate 240. As the metal material, copper, aluminum, or an alloy including these can be used.

The configuration makes it possible to efficiently remove heat of the thrust pad 210 while maintaining the above-described function of the thrust pad 210.

A cooling groove may be provided on the pad surface 260 of the thrust pad 210, for example. A hole part that opens to the outer surface may be provided inside the thrust pad 210. The thrust pad 210 can be cooled more efficiently by the flow of water through the groove or the hole part.

Furthermore, in the embodiment, an example has been described in which the rotary machine 1 is used in a state of being submerged in water, and a water film by water is formed inside the clearance. However, the disclosure is not limited thereto, and the rotary machine 1 may be used in a state of being submerged in another liquid such as oil and a liquid film such as oil may be formed in the clearance. As the rotary machine 1 used in gas, a gas film by a gas such as air may be formed on the clearance. That is, the rotary machine 1 may be used in any environment as long as the environment allows a fluid film to be formed on the clearance.

In the embodiment, an example in which the fluid film bearing is applied to the thrust bearing 200 has been described, but the disclosure is not limited thereto, and the fluid film bearing may be applied to the radial bearing. In this case, a plurality of radial pads as bearing pads are arranged in the circumferential direction on the inside surface of the ring surrounding the rotor shaft 20. The radial pad has a configuration in which the base layer 220, the elastic layer 230, the metal plate 240, and the sliding layer 250 of the embodiment are sequentially layered from the radial outside to inside. The surface on the radial inside of the sliding layer 250 is the pad surface 260 opposing the rotor shaft 20. The pad surface 260 may have a slope approaching the rotor shaft 20 toward the front side in the rotational direction R. This makes it possible to achieve the same effect as that of the thrust bearing 200 of the embodiment.

Notes

The fluid film bearing described in each embodiment is understood as follows, for example.

(1) A fluid film bearing according to a first aspect includes the plurality of bearing pads 210 that are arranged in the circumferential direction of the rotating body 10 that rotates about the axis O, and that support the rotating body 10 via a fluid film, in which the bearing pad 210 includes the base layer 220 made of metal, the elastic layer 230 that is layered on the rotating body 10 side of the base layer 220, and that is made of an elastically deformable elastic material, the sliding layer 250 that is layered on the rotating body 10 side of the elastic layer 230, and that opposes the rotating body 10 and is made of a bearing material, and the metal plate 240 that is layered between the elastic layer 230 and the sliding layer 250, and that is more rigid than the elastic layer 230 and the sliding layer 250.

In the fluid film bearing having such a configuration, the metal plate 240 having high rigidity is disposed between the sliding layer 250 and the elastic layer 230 even when surface pressure acts on the pad surface 260 via the fluid film, it is possible to suppress the elastic layer 230 from deforming so as to be recessed. As a result, the bearing pad 210 is not greatly recessed as a whole. A reduction in load capacity can be avoided.

(2) A fluid film bearing according to a second aspect is the fluid film bearing according to (1), in which the pad surface 260 opposing the rotating body 10 in the sliding layer 250 extends so as to approach the rotating body 10 toward the front side in the rotational direction R of the rotating body 10.

The fluid is brought with rotation of the rotating body 10, thereby drawing the fluid into the clearance between the rotating body 10 and the pad surface 260. Here, in the present aspect, the pad surface 260 is provided with a slope, and a fluid inlet side of the clearance is open. This makes it possible to easily draw the fluid into the clearance.

When the elastic layer 230 deforms in accordance with the surface pressure from the fluid having been thus drawn, the slope of the pad surface 260 becomes smaller than the initial slope. That is, by the pad surface 260 becoming a micro slope surface, an appropriate wedge-shaped water film can be formed in the clearance, and the load capacity can be improved.

(3) The fluid film bearing according to a third aspect is the fluid film bearing according to (1) or (2), in which the bearing pad 210 further includes a cooling plate that is disposed between the sliding layer 250 and the metal plate 240 and that is made of a metal material higher in thermal conductivity than the metal plate 240.

This makes it possible to efficiently remove heat while maintaining the function of the bearing pad 210.

(4) A fluid film bearing according to a fourth aspect is the fluid film bearing according to (1) to (3), in which a plurality of the bearing pads are circumferentially arranged so as to oppose the rotating body 10 from the axis O direction, and the pad surface 260 supports the rotating body 10 from the axis O direction.

This makes it possible to achieve the thrust bearing 200 with high load capacity.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A fluid film bearing comprising:
a plurality of bearing pads arranged in a circumferential direction of a rotating body that rotates about an axis, the bearing pads being configured to support the rotating body via a fluid film, wherein
each of the plurality of bearing pads includes
a base layer made of metal,
an elastic layer made of an elastically deformable elastic material, the elastic layer being layered on the rotating body side of the base layer,
a sliding layer made of a bearing material, the sliding layer being layered on the rotating body side of the elastic layer and facing the rotating body, and
a metal plate that is more rigid than the elastic layer and the sliding layer, the metal plate being layered between the elastic layer and the sliding layer.

2. The fluid film bearing according to claim 1, wherein a pad surface, of the sliding layer, facing the rotating body extends so as to become closer to the rotating body closer to a front side in a rotational direction of the rotating body.

3. The fluid film bearing according to claim 1, wherein each of the plurality of bearing pads further includes
a cooling plate made of a metal material higher in thermal conductivity than the metal plate, the cooling plate being disposed between the sliding layer and the metal plate.

4. The fluid film bearing according to claim 1, wherein
a plurality of the bearing pads are circumferentially arranged so as to face the rotating body in an axial direction, and
a pad surface, of the sliding layer, facing the rotating body supports the rotating body in the axial direction.

* * * * *